(12) United States Patent
Liu

(10) Patent No.: US 11,041,994 B2
(45) Date of Patent: Jun. 22, 2021

(54) OPTICAL FIBER ADAPTER

(71) Applicant: ACSUPER TECHNOLOGIES INC., Miaoli County (TW)

(72) Inventor: Mei Miao Liu, Taipei (TW)

(73) Assignee: ACSUPER TECHNOLOGIES INC., Miaoli County (TW)

( * ) Notice: Subject to any disclaimer, the term of this patent is extended or adjusted under 35 U.S.C. 154(b) by 0 days.

(21) Appl. No.: 16/554,637

(22) Filed: Aug. 29, 2019

(65) Prior Publication Data

US 2020/0341203 A1 Oct. 29, 2020

Related U.S. Application Data

(60) Provisional application No. 62/838,295, filed on Apr. 24, 2019.

(51) Int. Cl.
*G02B 6/38* (2006.01)
*G02B 6/00* (2006.01)

(52) U.S. Cl.
CPC .................. *G02B 6/3825* (2013.01)

(58) Field of Classification Search
CPC ........... G02B 6/38; G02B 6/3825; G02B 6/00
USPC ......................................................... 385/134
See application file for complete search history.

(56) References Cited

U.S. PATENT DOCUMENTS

| | | | | |
|---|---|---|---|---|
| 7,972,066 B1* | 7/2011 | Lin | ...................... | G02B 6/3825 385/55 |
| 8,870,466 B2* | 10/2014 | Lu | ........................ | G02B 6/3807 385/58 |
| 8,965,166 B2* | 2/2015 | Yang | ..................... | G02B 6/3825 385/134 |
| 2002/0181888 A1* | 12/2002 | Zimmel | ................. | G02B 6/266 385/72 |
| 2010/0081303 A1* | 4/2010 | Roth | ..................... | G02B 6/3817 439/140 |
| 2010/0239220 A1* | 9/2010 | Lin | ....................... | G02B 6/3825 385/134 |
| 2012/0321266 A1* | 12/2012 | Lin | ...................... | G02B 6/3849 385/134 |
| 2016/0306121 A1* | 10/2016 | Yang | ..................... | G02B 6/3825 |

(Continued)

FOREIGN PATENT DOCUMENTS

| | | |
|---|---|---|
| CN | 202075464 U | 12/2011 |
| TW | 530952 U | 5/2003 |
| TW | 201638617 A | 11/2016 |

*Primary Examiner* — Kaveh C Kianni

(57) ABSTRACT

An optical fiber adapter includes a main body, an inner housing, a cover plate and a latch element. The main body has an the axial accommodation room formed by a top wall, a bottom wall and two side walls opposite to each other. Two axial ends of the axial accommodation room have a first opening and a second opening respectively. An access opening and at least one fixing-groove structure are formed on the top wall. The fixing-groove structure is located between the access opening and the first opening. The latch element includes a fixing portion, a connecting portion and an inserting portion. The connecting portion is connected to the fixing portion and the inserting portion. The latch element is movably introduced into the axial accommodation room via the first opening. The fixing portion is clamped in the fixing-groove structure. The inserting portion is inserted into the accommodation groove.

12 Claims, 8 Drawing Sheets

(56) References Cited

U.S. PATENT DOCUMENTS

2017/0097485 A1* 4/2017 Yang .................... G02B 6/3849
2018/0217338 A1   8/2018 Takano et al.
2019/0331860 A1* 10/2019 Yang .................... G02B 6/3825
2019/0384017 A1* 12/2019 Lu ........................ G02B 6/3893

* cited by examiner

OPTICAL FIBER ADAPTER

FIELD OF THE INVENTION

The present invention relates to an optical fiber adapter, and more particularly to the optical fiber adapter having a latch element.

BACKGROUND OF THE INVENTION

Optical fiber has been widely used as a transmission medium for signals in recent years. A fiber optic connector and a fiber optic adapter can be used if two optical fibers are connected together. In general, the fiber optic connectors are disposed at the two ends of the fiber and can be inserted into the opening of the fiber optic adapter. The fiber optic adapter has two openings, and each one opening is for one fiber optic connector.

U.S. Pat. No. 8,965,166 discloses a fiber optic adapter, which includes a main body having an axial accommodation room. An inner housing is disposed into the axial accommodation room via an access opening in the top wall of the axial accommodation room. A cover plate covers the access opening to be fixed to the main body. In general, the assembly of the cover plate and the main body is mainly by an ultrasonic welding method or in a mechanical clamp manner. Specifically, it is difficult for the disassembly in which components are difficult to be replaced when the ultrasonic welding method is used; and the fixing stability between the cover plate and the main body is not good when the cover plate and the main body are assembled in a mechanical clamp manner.

SUMMARY OF THE INVENTION

The present invention provides an optical fiber adapter, which has the advantages that the cover plate can be fixed firmly at a right position.

The optical fiber adapter provided by the present invention includes a main body, an inner housing, a cover plate and a latch element. The main body has an the axial accommodation room, wherein the axial accommodation room is formed by a top wall, a bottom wall and two side walls opposite to each other. The two side walls are connected to the top wall and the bottom wall. Two axial ends of the axial accommodation room have a first opening and a second opening respectively. An access opening and at least one fixing-groove structure are formed on the top wall. The fixing-groove structure is located between the access opening and the first opening. The inner housing is fixed in the axial accommodation room. The cover plate is positioned at the main body and covers the access opening. The cover plate includes a first side surface and a second side surface opposite to each other. The first side surface and the second side surface face the first opening and the second opening respectively. The cover plate is formed with at least one accommodation groove at least passing through the first side surface. The latch element includes a fixing portion, a connecting portion and an inserting portion. The connecting portion is connected to the fixing portion and the inserting portion. The latch element is movably introduced into the axial accommodation room via the first opening. At least part of the fixing portion is clamped in the fixing-groove structure. The inserting portion is inserted into the accommodation groove.

In an embodiment of the invention, a locking window is formed on the fixing portion of the latch element for interfering with a connected optical fiber connector.

In an embodiment of the invention, at least one hook portion is formed at the fixing portion of the latch element for interfering with a connected optical fiber connector.

In an embodiment of the invention, the fixing portion and the connecting portion of the latch element are connected to each other in a stepped manner, and the connecting portion and the inserting portion are lower than the fixing portion and are adjacent to the bottom wall.

In an embodiment of the invention, a plurality of partition walls is disposed at the top wall of the main body. The plurality of partition walls face the bottom wall and partition the axial accommodation room into a plurality of sub-accommodation rooms. Each of the plurality of sub-accommodation rooms has two inner surfaces opposite to each other. An axial guide portion is formed on the two inner surfaces respectively. The two axial guide portions of the two inner surfaces are opposite to each other.

In an embodiment of the invention, a quantity of the fixing-groove structures is plural. The plurality of fixing-groove structures correspond to the plurality of sub-accommodation rooms respectively. A quantity of the accommodation grooves of the cover plate is plural. The plurality of accommodation grooves correspond to the plurality of sub-accommodation rooms respectively. A quantity of the latch elements is plural. Each of the plurality of latch elements is movably introduced into the respective sub-accommodation room via the first opening. The fixing portion of the latch element is clamped in the fixing-groove structure. The inserting portion inserted into the accommodation groove.

In an embodiment of the invention, the accommodation groove is the accommodation groove is a hollow channel at least passing through the first side surface.

In an embodiment of the invention, the cover plate further includes a bottom surface. The bottom surface faces the axial accommodation room and is connected to the first side surface and the second side surface. The accommodation groove passes through the bottom surface and at least the first side surface.

In an embodiment of the invention, the fixing-groove structure is further formed between the access opening and the second opening. The accommodation groove further passes through the second side surface. The latch element is further movably introduced into the axial accommodation room via the second opening.

In an embodiment of the invention, the fixing-groove structure is formed by a continuous opening slot extending to the first opening. The fixing portion of the latch element is clamped to the continuous opening slot.

In an embodiment of the invention, the fixing-groove structure includes at least one slot and at least one opening slot separated from each other. The opening slot extends to the first opening. The fixing portion of the latch element includes at least one protruding structure adjacent to the connecting portion. The protruding structure is clamped to the slot.

In an embodiment of the invention, at least one hook portion is disposed on a bottom surface of the fixing portion of the latch element for interfering with a connected optical fiber connector.

In an embodiment of the invention, the inner housing includes a first inner housing element and a second inner housing element. Each of the first and the second inner housing elements includes at least one hollow cylinder respectively. The first and the second inner housing elements are fixed in the axial accommodation room. The hollow cylinder of the first inner housing element faces the first opening. The hollow cylinder of the second inner housing element faces the second opening.

The optical fiber adapter provided by the present invention includes a main body, an inner housing and a latch element. The main body has an the axial accommodation room. The axial accommodation room is formed by a top wall, a bottom wall and two side walls opposite to each other. Two axial ends of the axial accommodation room have a first opening and a second opening respectively. At least one fixing-groove structure is formed on the top wall. An inner housing is fixed in the axial accommodation room. The latch element includes a fixing portion and a rear portion. A locking window is formed on the fixing portion. The fixing portion is clamped in the fixing-groove structure. The rear portion is disposed in the axial accommodation room.

In an embodiment of the invention, the fixing portion and the rear portion of the latch element are connected to each other in a stepped manner. The rear portion is lower than the fixing portion and adjacent to the bottom wall.

In an embodiment of the invention, a plurality of partition walls is disposed at the top wall of the main body. The plurality of partition walls faces the bottom wall and partitions the axial accommodation room into a plurality of sub-accommodation rooms. Each of the plurality of sub-accommodation rooms has two inner surfaces opposite to each other. An axial guide portion is formed on the two inner surfaces respectively. The two axial guide portions of the two inner surfaces are opposite to each other.

In an embodiment of the invention, a quantity of the fixing-groove structures is plural. The plurality of fixing-groove structures correspond to the plurality of sub-accommodation rooms respectively. A quantity of the latch elements is plural. The fixing portion of each of the plurality of latch elements is clamped in the respective fixing-groove structure.

In an embodiment of the invention, the plurality of latch elements have different colors respectively, or some of the latch elements have the same color and some of the latch elements have different colors.

In an embodiment of the invention, the fixing-groove structure is further formed between the access opening and the second opening.

In an embodiment of the invention, the inner housing includes a first inner housing element and a second inner housing element. Each of the first and the second inner housing elements includes at least one hollow cylinder respectively. The first and the second inner housing elements are fixed in the axial accommodation room. The hollow cylinder of the first inner housing element faces the first opening. The hollow cylinder of the second inner housing element faces the second opening.

In the invention, by pushing the latch element into the axial accommodation room, the inserting portion of the latch element is inserted into the accommodation groove of the main body, the connecting portion of the latch element is abutted against the inner surface of the top wall of the main body, and the fixing portion of the latch element is clamped to the opening slot or clamped between the partition walls on two sides of the sub-accommodation room. As a result, the cover plate is limited by the latch element in each direction and therefore is firmly fixed to the main body, so that the cover plate and the main body are firmly fastened with each other by the latch element. Thus, when the latch element is pulled out of the axial accommodation room and disengaged from the cover plate, the cover plate is not limited by the latch element and can be removed for replacement.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
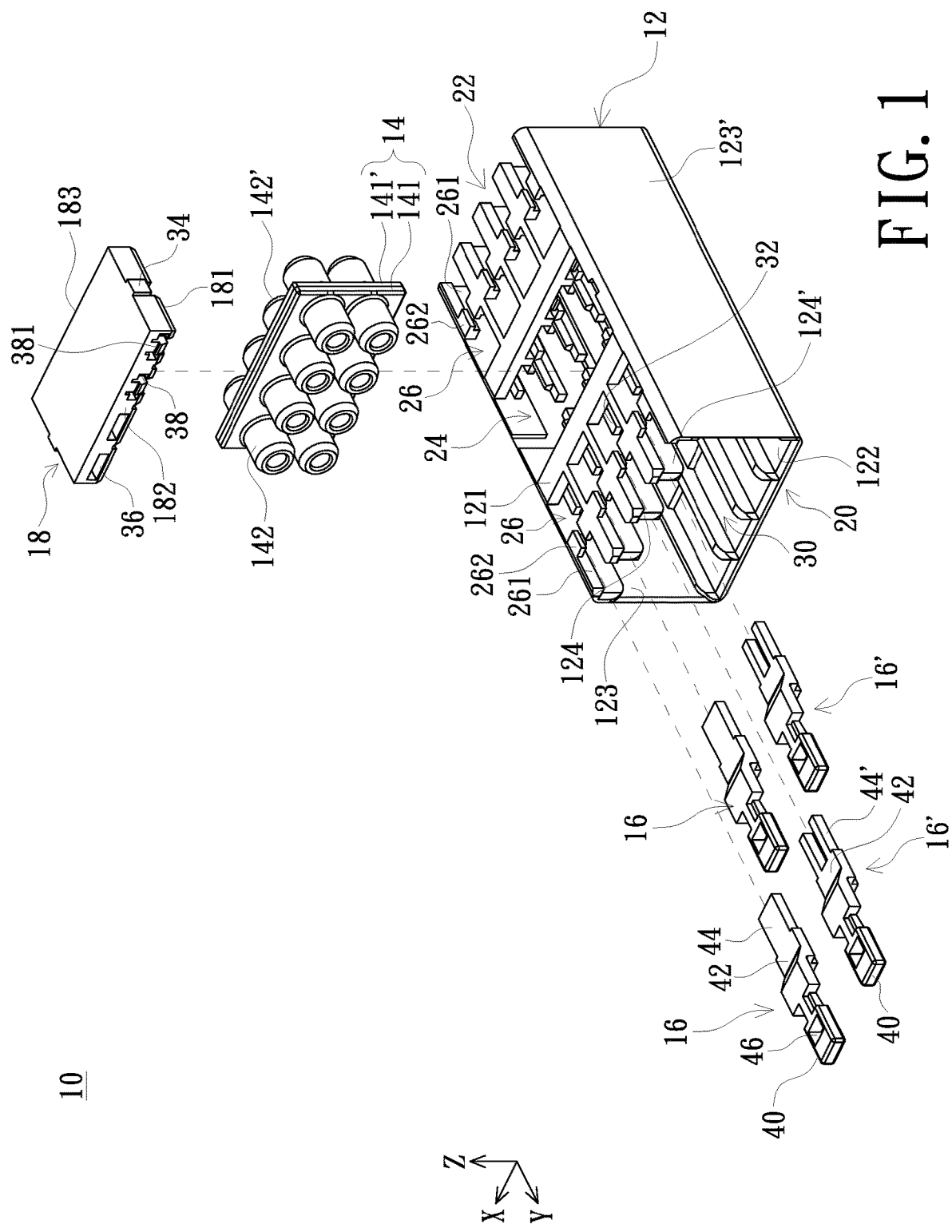
FIG. 1 is a schematic perspective exploded view of an optical fiber adapter according to a first embodiment of the present invention.
Figure 2:
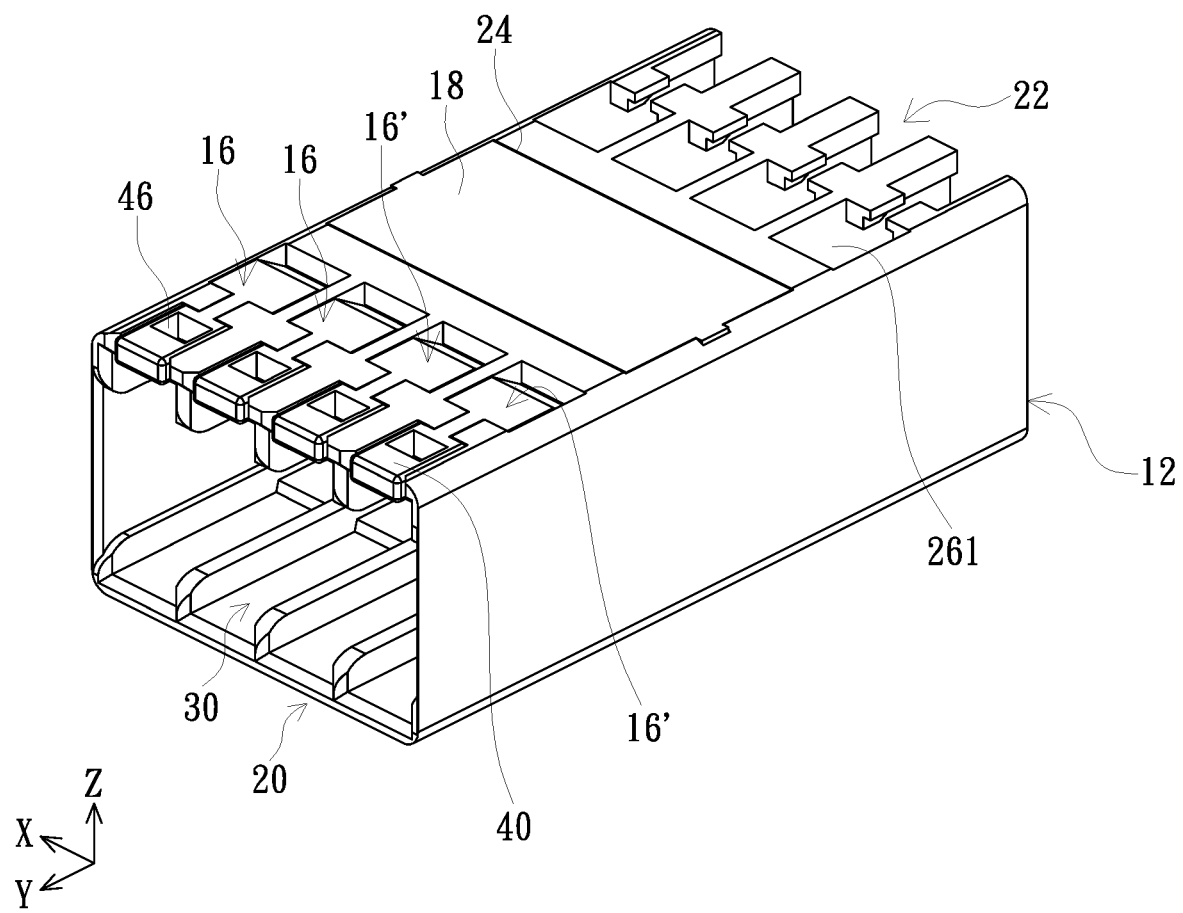
FIG. 2 is a schematic view of an assembly of an optical fiber adapter according to a first embodiment of the present invention.
Figure 3:
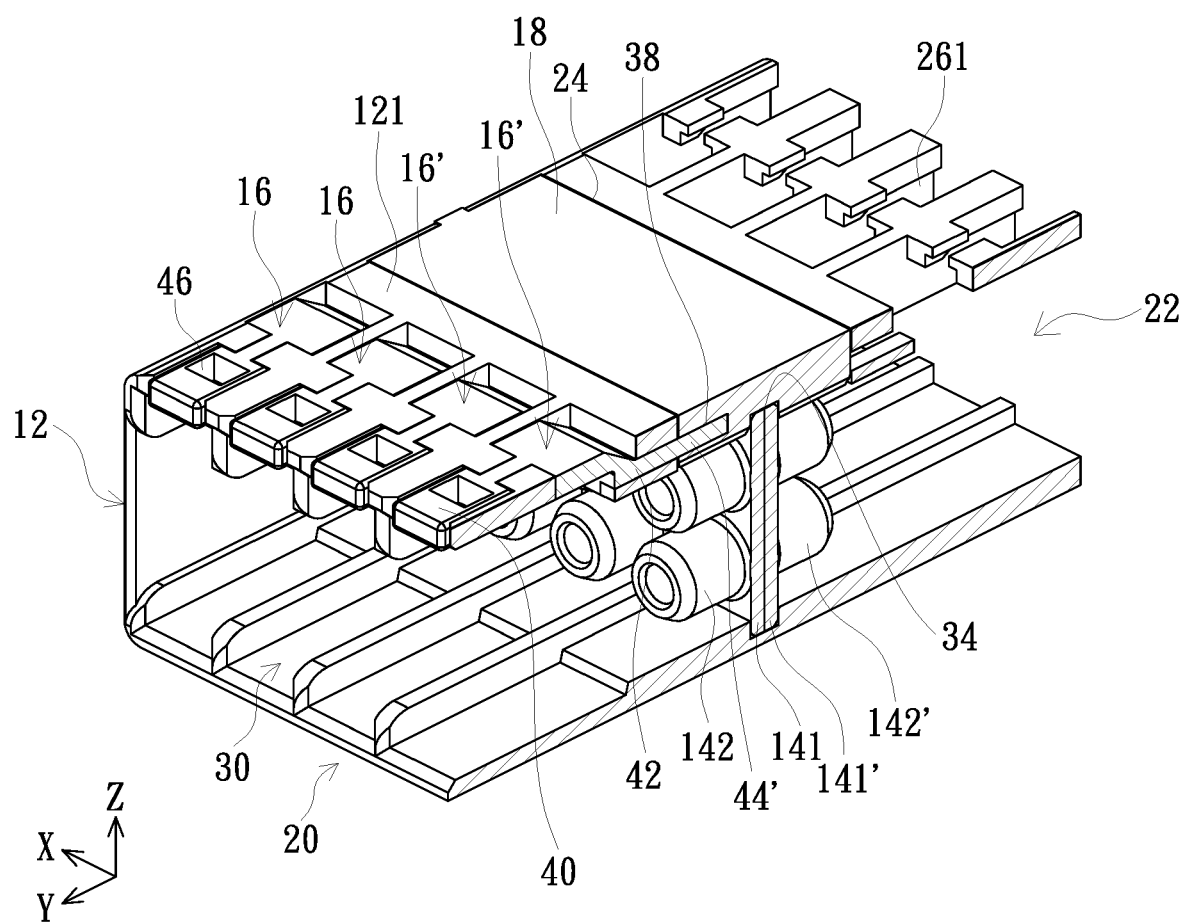
FIG. 3 is a schematic perspective cross-sectional view of the optical fiber adapter shown in FIG. 2.

FIG. 1 is a schematic perspective exploded view of an optical fiber adapter according to a first embodiment of the present invention, FIG. 2 is a schematic view of an assembly of an optical fiber adapter according to a first embodiment of the present invention, and FIG. 3 is a schematic perspective cross-sectional view of the optical fiber adapter shown in FIG. 2. As shown in FIG. 1, the optical fiber adapter 10 includes a main body 12, an inner housing 14, a latch element 16/16' and a cover plate 18. The main body 12 has an axial accommodation room (not labeled). The axial accommodation room may extend, for example, along the Y-axis direction and is formed by a top wall 121, a bottom wall 122, and two side walls 123, 123' opposite to each other. The top wall 121 is opposite to the bottom wall 122, and the top wall 121 and the bottom wall 122 are connected to the two opposite side walls 123, 123'. Two axial ends of the axial accommodation room have a first opening 20 and a second opening 22 respectively. The top wall 121 is formed with an access opening 24 and fixing-groove structures 26. The fixing-groove structures 26 are disposed between the access opening 24 and the first opening 20 as well as between the access opening 24 and the second opening 22. In an embodiment as shown in FIG. 1, the fixing-groove structure 26 is formed by a continuous opening slot 261 extending to the first opening 20/the second opening 22. Two opposite ribs 262 are disposed at the middle portion of the continuous opening slot 261.

Continue with the above description. In an embodiment as shown in FIG. 1, a plurality of opposite partition walls 124, 124' are disposed on the opposite inner surfaces of the top wall 121 and the bottom wall 122 to partition the axial accommodation room into a plurality of sub-accommodation rooms 30. Each of the sub-accommodation rooms 30 may extend, for example, along the Y-axis direction, and the plurality of sub-accommodation rooms 30 may be arranged, for example, along the X-axis direction. The two partition walls 124, 124' forming each of the sub-accommodation rooms 30 have two opposite inner surfaces. An axial guide portion 32 is respectively formed on the two inner surfaces (wherein only one axial guide portion 32 is shown in the figure), and the two axial guide portions 32 are opposite to each other. In an embodiment, a quantity of the fixing-groove structures 26 is plural, and the plurality of fixing-groove structures 26 are disposed side by side between the access opening 24 and the first opening 20 as well as between the access opening 24 and the second opening 22. Further, the configuration of the fixing-groove structures 26 corresponds to the configuration of the sub-accommodation rooms 30. The quantity of the sub-accommodation rooms 30 is four in the optical fiber adapter 10 shown in FIG. 1, but the present invention is not limited thereto.

The inner housing 14 has two identical inner housing elements 141, 141', and the inner housing elements 141, 141' have the hollow cylinders 142, 142' respectively. As shown in FIGS. 2 and 3, the two inner housing elements 141, 141' are disposed in the axial accommodation room via the access opening 24. The hollow cylinders 142 of the inner housing element 141 face the first opening 20, and the hollow cylinders 142' of the inner housing element 141' face the second opening 22.

As shown in FIG. 1, the cover plate 18 includes a bottom surface 181, a first side surface 182 and a second side surface 183 opposite to the first side surface 182. The bottom surface 181 faces the bottom wall 122, and the first side surface 182 and the second side surface 183 respectively face the first opening 20 and the second opening 22. The bottom surface 181 of the cover plate 18 is formed with a long notch 34 parallel to the first side surface 182 and the second side surface 183. The cover plate 18 is formed with accommodation grooves 36, 38. The accommodation grooves 36, 38 extend, for example, along the Y-axis direction and pass through the first side surface 182 and the second side surface 183. The accommodation grooves 36, 38 are disconnected at the middle portion thereof by the long notch 34. In an embodiment, the plurality of accommodation grooves 36, 38 are arranged in parallel. As shown in FIGS. 2 and 3, the cover plate 18 is positioned at the main body 12 and covers the access opening 24. In an embodiment, the cover plate 18 is placed, for example, along the Z-axis direction to be positioned at the main body 12. The top edges of the two inner housing elements 141, 141' are clamped in the long notch 34, and each of the accommodation grooves 36/38 (labeled in FIG. 1) corresponds to one sub-accommodation room 30.

As shown in FIG. 1, the accommodation groove 36 may be in a hollow-channel shape and the accommodation groove 38 may be in a groove-channel shape passing through the bottom surface 181. The embodiment shown in FIGS. 1 to 3 is exemplified by that the cover plate 18 has two accommodation grooves 36 in the hollow-channel shape and two accommodation grooves 38 in the groove-channel shape, but the present invention is not limited thereto. In other un-illustrative embodiments, the cover plate 18 may have the accommodation grooves 36 all in the hollow-channel shape 36 only; alternatively, the cover plate 18 may have the accommodation grooves 38 all in the groove-channel shape only.

As shown in FIG. 1, the latch element 16/16' includes a fixing portion 40, a connecting portion 42 and an inserting portion 44/44'. The connecting portion 42 is between the inserting portion 44/44' and the fixing portion 40. In an embodiment, the fixing portion 40 and the connecting portion 42 are connected to each other in a stepped manner, wherein the connecting portion 42 and the inserting portion 44/44' are lower than the fixing portion 40. In an embodiment, the shape of the fixing portion 40 corresponds the shape of the continuous opening slot 261 and is slightly shaped as "I", and the width of the connecting portion 42 in the X-axis direction is slightly wider than the inserting portion 44/44'. In an embodiment, the latch element 16 has a plate-like inserting portion 44, and the latch element 16' has a two-pin-like inserting portions 44'. The embodiment shown in FIG. 1 is exemplified by that the two latch elements 16 have the plate-like inserting portions 44 and the two latch elements 16' have the two-pin-like inserting portions 44', but the present invention is not limited thereto. The optical fiber adapter 10 may include the latch elements 16 having the plate-like inserting portions 44 only; alternatively, the optical fiber adapter 10 may include the latch elements 16' having the two-pin-like inserting portions 44' only. In an embodiment as shown in FIGS. 2 and 3, the latch element 16/16' is movably introduced into the sub-accommodation room 30 via the first opening 20 and/or the second opening 22. In an embodiment, the latch element 16/16' is slid into the respective sub-accommodation room 30 along the two axial guide portions 32 (shown in FIG. 1) thereof. The connecting portion 42 having a lower position is abutted against the inner side of the top wall 121, the inserting portion 44/44' is inserted into the accommodation groove 36/38, and the fixing portion 40 having a higher position is clamped in the continuous opening slot 261. In an embodiment, the plate-like inserting portion 44 may be inserted into the accommodation groove 36 in hollow-channel shape, and the two-pin-like inserting portion 44' may be inserted into the accommodation groove 38 in groove-channel shape, but the present invention is not limited thereto. In an embodiment as shown in FIG. 1, corresponding to the design in which the inserting portion 44' of the latch element 16' is in the two-pin-like shape, a partition portion 381 is respectively disposed at an end of the accommodation groove 38 in groove-channel shape adjacent to the first side surface 182/the second side surface 183. As such, the opening in the first side surface 182/the second side surface 183 of the accommodation groove 38 is partitioned into two portions, and through which the two-pin-like inserting portion 44' is leaded to be inserted.

As shown in FIGS. 1 to 3, the fixing portion 40 of the latch element 16/16' is formed with a locking window 46 in response to the connection with an optical fiber connector (not shown in the figure) having a latch. A typical optical fiber connector has a rectangular shape in which the cross-sectional shape is a square. The optical fiber connector includes a hollow, rectangular housing. A resilient latch is disposed on the top wall of the housing. The optical fiber connector further includes a ferrule located in the housing and extending from a circular opening at the front end of the housing. As the optical fiber connector is connected to the optical fiber adapter 10, the ferrule of the optical fiber connector is connected to the hollow cylinder 142/142' of the inner housing 14 of the optical fiber adapter 10, and the latch of the optical fiber connector interferes with the locking window 46 of the optical fiber adapter 10 and is locked in the locking window 46. In an embodiment, the locking window 46 may be a square hole or a square notch.

Figure 4:
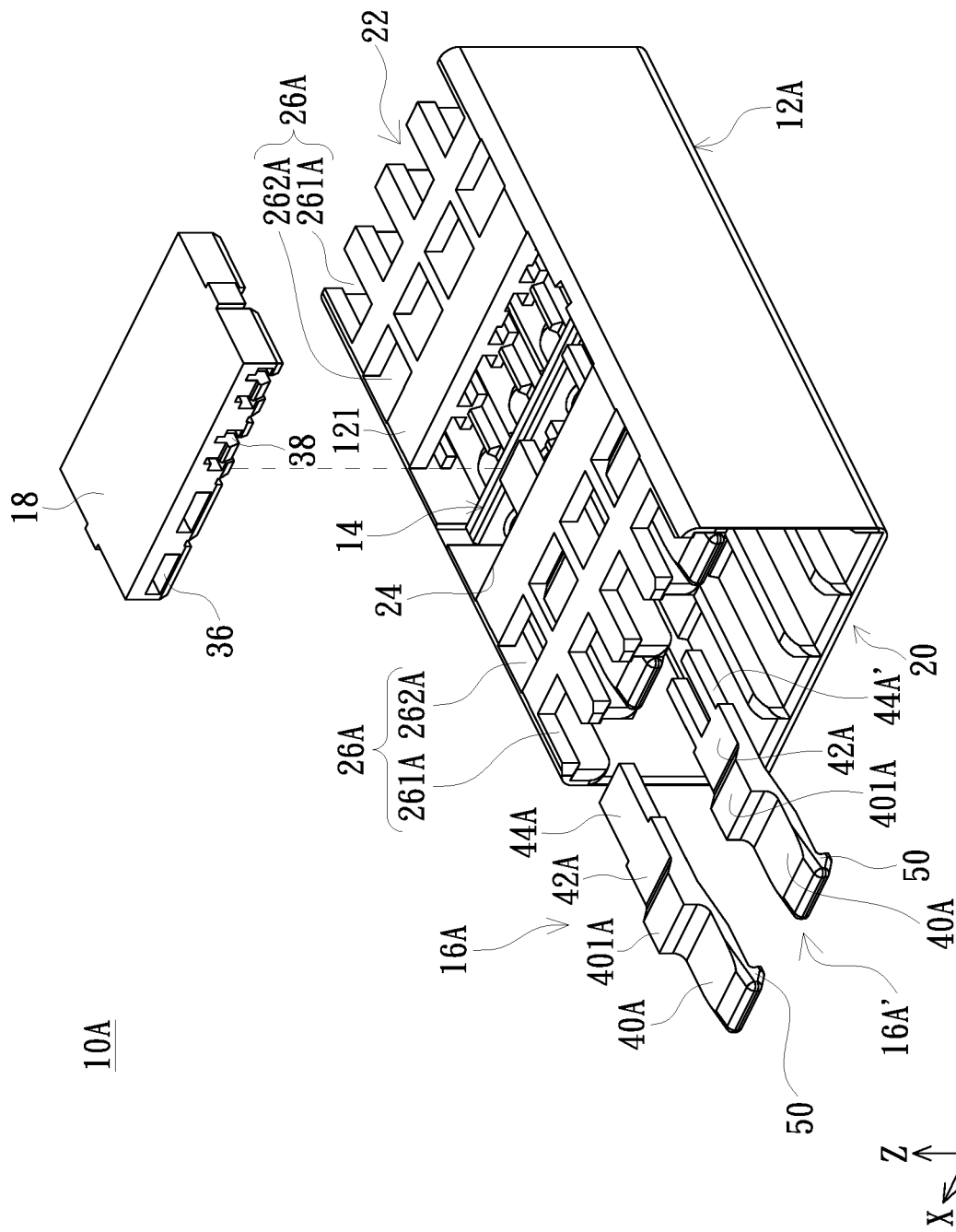
FIG. 4 is a schematic partially exploded perspective view of an optical fiber adapter according to a second embodiment of the present invention.
Figure 5:
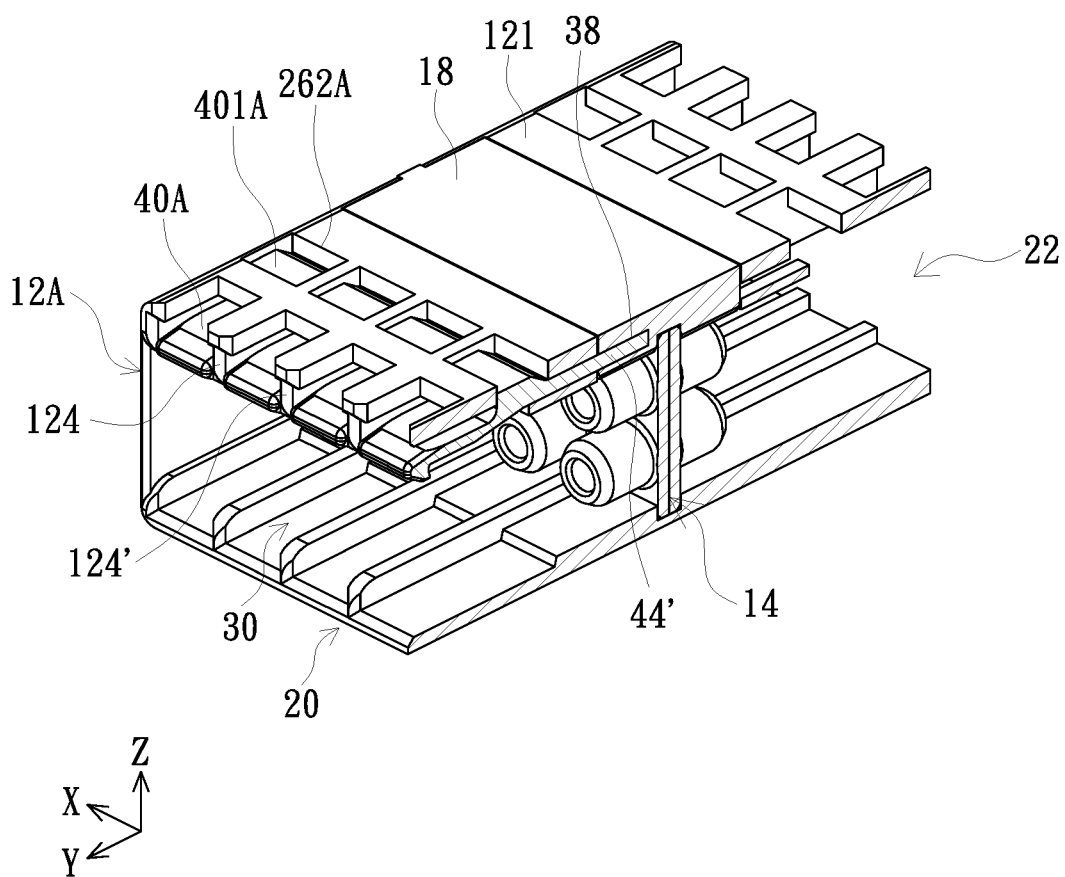
FIG. 5 is a schematic perspective cross-sectional view of an optical fiber adapter according to a second embodiment of the present invention.

FIG. 4 is a schematic partially exploded perspective view of an optical fiber adapter according to a second embodiment of the present invention, and FIG. 5 is a schematic perspective cross-sectional view of an optical fiber adapter according to a second embodiment of the present invention. As shown in FIGS. 4 and 5, the optical fiber adapter 10A includes a main body 12A, an inner housing 14, a latch element 16A/16A' and a cover plate 18. In the second embodiment, in response to that the optical fiber connector to be connected with is a subscriber (SC) optical fiber connector, the latch element 16A/16A' includes a hook portion 50, a fixing portion 40A, a connecting portion 42A and an inserting portion 44A/44A'. The connecting portion 42A is between the fixing portion 40A and the inserting portion 44A/44A'. The hook portion 50 is downward disposed at an end of the fixing portion 40A away from the connecting portion 42A. In an embodiment, the fixing portion 40A has a protruding structure 401A adjacent to the connecting portion 42A. The connecting portion 42 is slightly wider than the inserting portion 44/44' in the X-axis direction. Further, as shown in FIG. 4, the latch element 16A has a plate-like inserting portion 44A, and the latch element 16A' has a two-pin-like inserting portion 44A'; however, the present invention is not limited thereto. The optical fiber adapter 10A may include the latch elements 16A all having the plate-like inserting portions 44A only; alternatively, the optical fiber adapter 10A may include the latch elements 16A' all having the two-pin-like inserting portions 44A' only.

Continue with the above description. In the second embodiment as shown in FIG. 4, the main difference between the main body 12A of the second embodiment and the main body 12 of the first embodiment is that the fixing-groove structure 26A is composed of an opening slot 261A and a slot 262A separated from each other, wherein the opening slot 261A extends to the first opening 20/the second opening 22, and the slot 262A is between the access opening 24 and the opening slot 261A. The other structure of the main body 12A is substantially the same as that of the main body 12, and no redundant detail is to be given herein. As shown in FIG. 5, the cover plate 18 is positioned at the main body 12A. The structure of the cover plate 18 shown in FIG. 5 is substantially the same as that of the cover plate 18 of the first embodiment shown in FIG. 1. The latch element 16A/16A' can be movably introduced into the sub-accommodation room 30 via the first opening 20 and/or the second opening 22, so that the inserting portion 44A/44A' is inserted into the accommodation groove 36/38 of the cover plate 18, and the protruding structure 401A on the fixing portion 40A is clamped in the slot 262A. In an embodiment, the two sides of the fixing portion 40A are respectively abutted against the partition walls 124, 124' on the two sides of the sub-accommodation room 30. In an embodiment, the fixing-groove structure 26A further has a reinforcing portion (not shown in the figure) covering the opening slot 261A.

Figure 6:
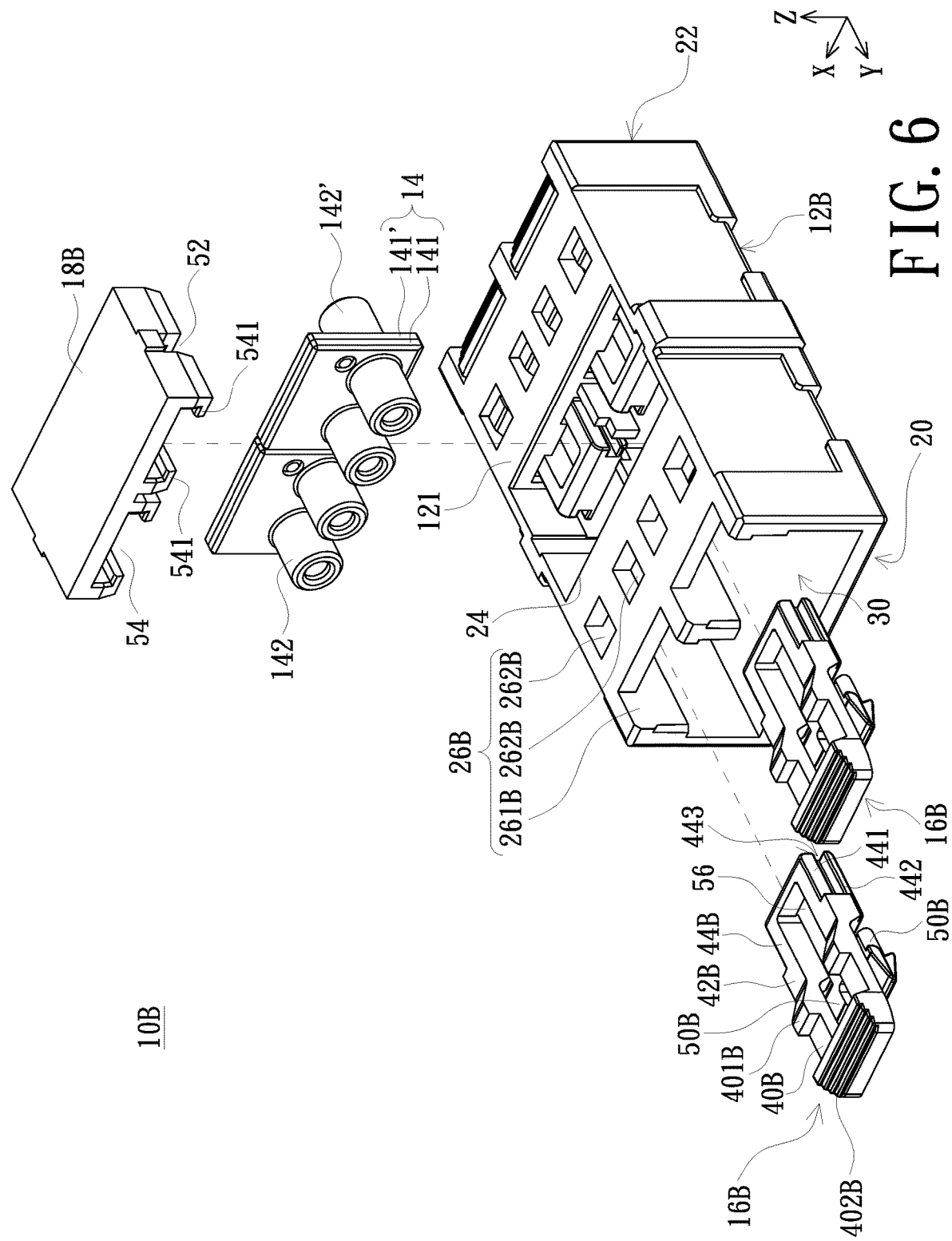
FIG. 6 is a schematic partially exploded perspective view of an optical fiber adapter according to a third embodiment of the present invention.
Figure 7:
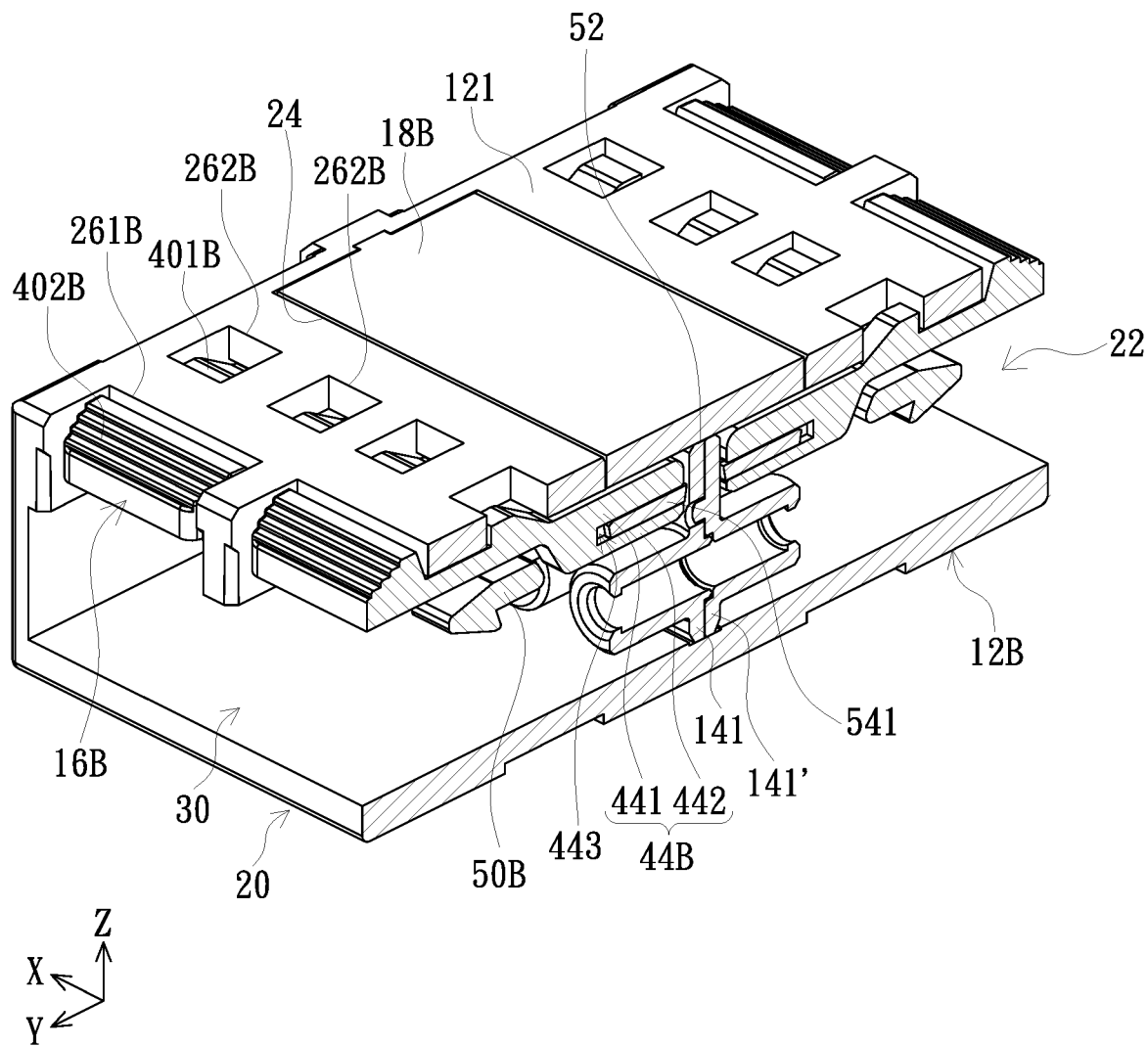
FIG. 7 is a schematic perspective cross-sectional view of an optical fiber adapter according to a third embodiment of the present invention.

FIG. 6 is a schematic partially exploded perspective view of an optical fiber adapter according to a third embodiment of the present invention, and FIG. 7 is a schematic perspective cross-sectional view of an optical fiber adapter according to a third embodiment of the present invention. As shown in FIGS. 6 and 7, the optical fiber adapter 10B includes a main body 12B, an inner housing 14, a latch element 16B and a cover plate 18. In the third embodiment, in response to that the optical fiber connector to be connected with is a subscriber (SC) optical fiber connector, each pair of the corresponding hollow cylinders 142, 142' of the inner housing elements 141, 141' are located in one sub-accommodation room 30. The embodiment shown in FIGS. 6 and 7 is exemplified by that the axial accommodation room has two sub-accommodation rooms 30, but the present invention is not limited thereto. In an embodiment, the fixing-groove structures 26B formed on the top wall 121 of the main body 12B includes an opening slot 261B and two slots 262B, that is, the top wall 121 corresponding to each sub-accommodation room 30 is formed with an opening slot 261B and two slots 262B arranged side by side. In an embodiment, the cover plate 18B has an accommodation groove 54 having an ⊓-shaped cross section and a disconnecting notch 52. The bottom edges of the two opposite side walls of the accommodation groove 54 are disposed with two opposite positioning portions 541. The accommodation groove 54 is in the axial direction (i.e., in the Y-axis direction), and the configuration of the accommodation groove 54 corresponds to the configuration of the sub-accommodation room 30. The disconnecting notch 52 is disposed at the middle portion of the bottom surface of the cover plate 18B and perpendicular to the accommodation groove 54. As shown in FIG. 7, the cover plate 18B is positioned at the main body 12B and covers the access opening 24 of the main body 12B. The top edges of the two inner housing elements 141, 141' are clamped to the disconnecting notch 52. The accommodation grooves 54 of the cover plate 18B are respectively located in the sub-accommodation rooms 30.

Continue with the above description. In the third embodiment as shown in FIG. 6, the latch element 16B includes two hook portions 50B, a fixing portion 40B, a connecting portion 42B and an inserting portion 44B. The connecting portion 42B is between the fixing portion 40B and the inserting portion 44B. The connected fixing portion 40B, the connecting portion 42B and the inserting portion 44B are formed with a hollow portion 56. In an embodiment, the top surface of the fixing portion 40B has two protruding structures 401B and a positioning protrusion 402B. The two protruding structures 401B are located at the two sides of the hollow portion 56 respectively. The positioning protrusion 402B is located at the front end of the fixing portion 40B. The two hook portions 50B are disposed on the bottom surface of the fixing portion 40B and are respectively located on the two sides of the hollow portion 56. The inserting portion 44B includes an upper inserting portion 441 and a lower inserting portion 442. A clamping space 443 is formed between the upper inserting portion 441 and the lower inserting portion 442. As shown in FIG. 7, the latch element 16B can be movably introduced into the sub-accommodation room 30 via the first opening 20 and/or the second opening 22. As such, the inserting portion 44B is inserted into the accommodation groove 54 (shown in FIG. 6) of the cover plate 18B, the clamping space 443 formed by the upper inserting portion 441 and the lower inserting portion 442 clamps the positioning portions 541 on the two sides of the accommodation groove 54, the two protruding structures 401B on the fixing portion 40B are respectively clamped in the two slots 262B, the positioning protrusion 402B is positioned at the opening slot 261B, and the two hook portions 50B are located in the sub-accommodation room 30. The two hook portions 50B interfere with the optical fiber connector to be connected with to complete the connection.

According to the aforementioned description in the first, the second and the third embodiments, the cover plate is positioned at the main body and covers the access opening. By pushing the latch element into the axial accommodation room, the inserting portion of the latch element is inserted into the accommodation groove of the main body, the connecting portion of the latch element is abutted against the inner surface of the top wall of the main body, and the fixing portion of the latch element is clamped to the opening slot or clamped between the partition walls on two sides of the sub-accommodation room. As a result, the cover plate is limited by the latch element in the X-axis, Y-axis and Z-axis directions and therefore is firmly fixed to the main body, so that the cover plate and the main body are firmly fastened with each other by the latch element. When the latch element is pulled out of the axial accommodation room and disengaged from the cover plate, the cover plate is not limited by the latch element and can be removed for replacement. Thus, the optical fiber adapter of the present invention solves the problem in which in which components are difficult to be replaced when the ultrasonic welding method is used and also solves the problem in which the fixing stability between the cover plate and the main body is not good when the cover plate and the main body are assembled in a mechanical clamp manner. Further, in an embodiment, the latch elements may have different colors, or some of the latch elements have the same color and some of the latch elements have different colors. Since the latch elements can be externally displayed outside the main body via the fixing-groove structure, the exposure of the latch elements having different colors facilitate the subsequent connection with the optical fiber connector. As a result, the misconnection to the optical fiber connector can be avoided effectively.

Figure 8:
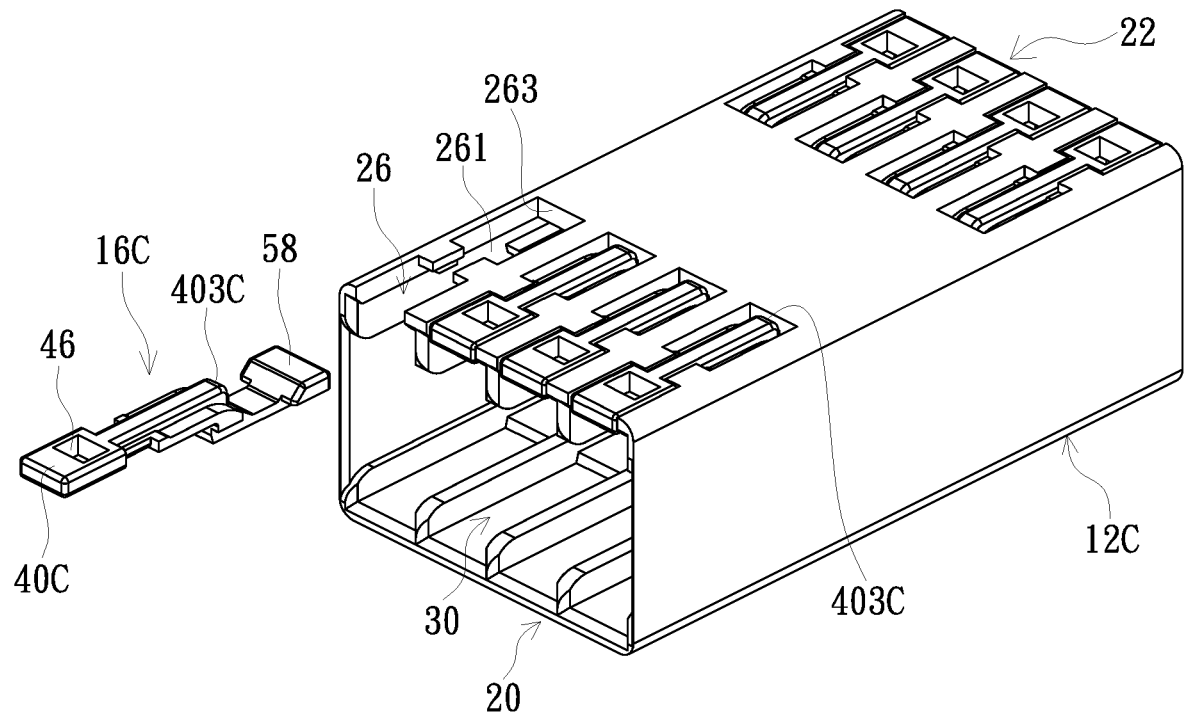
FIG. 8 is a schematic partially exploded perspective view of an optical fiber adapter according to a fourth embodiment of the present invention.

FIG. 8 is a schematic partially exploded perspective view of an optical fiber adapter according to a fourth embodiment of the present invention. As shown in FIG. 8, the optical fiber adapter 10C includes a main body 12C, an inner housing 14 (shown in FIG. 1) and a latch element 16C. The main body 12C includes an axial accommodation room, and the top wall 121 of the main body 12C is formed with a fixing-groove structure 26. In an embodiment, the fixing-groove structure 26 is formed by a continuous opening slot 261 having an I-shaped. The continuous opening slot 261 has a rear edge 263. The inner housing 14 is disposed in the main body 12C. The latch element 16C includes a fixing portion 40C and a rear portion 58, and a locking window 46 is formed on the fixing portion 40C.

Continue with the above description. In an embodiment, the fixing portion 40C and the rear portion 58 are connected to each other in a stepped manner, and the rear portion 58 is lower than the fixing portion 40C. As shown in FIG. 8, the fixing portion 40C of the latch element 16C is clamped in the continuous opening slot 261, the rear edge 403C of the fixing portion 40C is abutted against the rear edge 263 of the continuous opening slot 261, and the rear portion 58 is located in the sub-accommodation room 30 and is abutted against the inner surface of the top wall 121. In an embodiment, the latch elements 16C have different colors, or some of the latch elements 16C have the same color and some of the latch elements 16C have different colors.

According to aforementioned description in the fourth embodiment, the locking window 46 of the latch element 16C interferes with the latch of the optical fiber connector to complete the connection between the optical fiber adapter 10C and the optical fiber connector. Further, since the latch elements 16C can be externally displayed outside the main body 12C via the fixing-groove structure 26, the exposure of the latch elements 16C having different colors facilitate the subsequent connection with the optical fiber connector. As a result, the misconnection to the optical fiber connector can be avoided effectively.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical fiber adapter, comprising:
   a main body, having an axial accommodation room, wherein the axial accommodation room is formed by a top wall, a bottom wall and two side walls opposite to each other, the two side walls are connected to the top wall and the bottom wall, two axial ends of the axial accommodation room have a first opening and a second opening respectively, an access opening and at least one fixing-groove structure are formed on the top wall, and the fixing-groove structure is located between the access opening and the first opening;
   an inner housing, fixed in the axial accommodation room;
   a cover plate, positioned at the main body and covering the access opening, wherein the cover plate comprises a first side surface and a second side surface opposite to each other, the first side surface and the second side surface face the first opening and the second opening respectively, and the cover plate is formed with at least one accommodation groove at least passing through the first side surface, wherein the accommodation groove is a hollow channel at least passing through the first side surface; and
   at least one latch element, comprising a fixing portion, a connecting portion and an inserting portion, wherein the connecting portion is connected to the fixing portion and the inserting portion, the latch element is movably introduced into the axial accommodation room via the first opening, at least part of the fixing portion is clamped in the fixing-groove structure, and the inserting portion is inserted into the accommodation groove.

2. The optical fiber adapter according to claim 1, wherein a locking window is formed on the fixing portion of the latch element for interfering with a connected optical fiber connector.

3. The optical fiber adapter according to claim 1, wherein at least one hook portion is formed at the fixing portion of the latch element for interfering with a connected optical fiber connector.

4. The optical fiber adapter according to claim 1, wherein the fixing portion and the connecting portion of the latch element are connected to each other in a stepped manner, and the connecting portion and the inserting portion are lower than the fixing portion and are adjacent to the bottom wall.

5. The optical fiber adapter according to claim 1, wherein a plurality of partition walls are disposed at the top wall of the main body, the plurality of partition walls face the bottom wall and partition the axial accommodation room into a plurality of sub-accommodation rooms, each of the plurality of sub-accommodation rooms has two inner surfaces opposite to each other, an axial guide portion is formed on the two inner surfaces respectively, and the two axial guide portions of the two inner surfaces are opposite to each other.

6. The optical fiber adapter according to claim 5, wherein a quantity of the fixing-groove structures is plural, the plurality of fixing-groove structures correspond to the plurality of sub-accommodation rooms respectively, a quantity of the accommodation grooves of the cover plate is plural, the plurality of accommodation grooves correspond to the plurality of sub-accommodation rooms respectively, a quantity of the latch elements is plural, each of the plurality of latch elements is movably introduced into the respective sub-accommodation room via the first opening, the fixing portion of the latch element is clamped in the fixing-groove structure, and the inserting portion inserted into the accommodation groove.

7. The optical fiber adapter according to claim 1, wherein the cover plate further comprises a bottom surface, the bottom surface faces the axial accommodation room and is connected to the first side surface and the second side surface, and the accommodation groove passes through the bottom surface and at least the first side surface.

8. The optical fiber adapter according to claim 1, wherein the fixing-groove structure is further formed between the access opening and the second opening, the accommodation groove further passes through the second side surface, and the latch element is further movably introduced into the axial accommodation room via the second opening.

9. The optical fiber adapter according to claim 1, wherein the fixing-groove structure is formed by a continuous opening slot extending to the first opening, and the fixing portion of the latch element is clamped to the continuous opening slot.

10. The optical fiber adapter according to claim 1, wherein the fixing-groove structure comprises at least one slot and at least one opening slot separated from each other, the opening slot extends to the first opening, the fixing portion of the latch element comprises at least one protruding structure adjacent to the connecting portion, and the protruding structure is clamped to the slot.

11. The optical fiber adapter according to claim 10, wherein at least one hook portion is disposed on a bottom surface of the fixing portion of the latch element for interfering with a connected optical fiber connector.

12. The optical fiber adapter according to claim 1, wherein the inner housing comprises a first inner housing element and a second inner housing element, each of the first and the second inner housing elements comprises at least one hollow cylinder respectively, the first and the second inner housing elements are fixed in the axial accommodation room, the hollow cylinder of the first inner housing element faces the first opening, and the hollow cylinder of the second inner housing element faces the second opening.

* * * * *